(12) United States Patent
Cho

(10) Patent No.: US 9,522,587 B2
(45) Date of Patent: Dec. 20, 2016

(54) ACTIVE SUSPENSION APPARATUS FOR VEHICLE AND PUMP THEREOF

(71) Applicant: MANDO CORPORATION, Pyeongtaek-si, Gyeonggi-do (KR)

(72) Inventor: Gil Joon Cho, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/736,137

(22) Filed: Jun. 10, 2015

(65) Prior Publication Data
US 2015/0360530 A1    Dec. 17, 2015

(30) Foreign Application Priority Data
Jun. 11, 2014 (KR) ...................... 10-2014-0071 082

(51) Int. Cl.
| | |
|---|---|
| B60G 17/027 | (2006.01) |
| B60G 17/033 | (2006.01) |
| B60G 17/04 | (2006.01) |
| B60G 17/02 | (2006.01) |
| F04B 1/02 | (2006.01) |
| F04B 53/14 | (2006.01) |
| F04B 53/16 | (2006.01) |
| F04B 9/02 | (2006.01) |
| F16K 31/06 | (2006.01) |
| B60G 17/056 | (2006.01) |

(Continued)

(52) U.S. Cl.
CPC ......... *B60G 17/0408* (2013.01); *B60G 17/021* (2013.01); *B60G 17/027* (2013.01); *B60G 17/0272* (2013.01); *B60G 17/033* (2013.01); *B60G 17/056* (2013.01); *F04B 1/02* (2013.01); *F04B 9/02* (2013.01); *F04B 9/047* (2013.01); *F04B 53/14* (2013.01); *F04B 53/16* (2013.01); *F16H 25/2204* (2013.01); *F16K 31/0665* (2013.01); *B60G 2202/413* (2013.01); *B60G 2202/416* (2013.01); *B60G 2204/8102* (2013.01); *B60G 2500/11* (2013.01); *B60G 2600/182* (2013.01); *F16H 19/04* (2013.01); *H02K 7/1166* (2013.01); *Y10T 74/18656* (2015.01)

(58) Field of Classification Search
CPC . B60G 17/021; B60G 17/0272; B60G 17/033; B60G 21/073; B60G 2202/413; B60G 2600/182; B60G 2204/8102; F16H 25/2204; F04B 1/02; F04B 1/124
USPC .................. 280/5.505, 5.5, 124.161, 124.16, 280/124.162; 701/37; 417/534
See application file for complete search history.

(56) References Cited

U.S. PATENT DOCUMENTS 5,015,009 A * 5/1991 Ohyama ............ B60G 17/0162
                                                280/5.51
6,000,702 A   12/1999 Streiter
(Continued)

*Primary Examiner* — Keith Frisby
(74) *Attorney, Agent, or Firm* — McDermott Will & Emery LLP

(57) ABSTRACT

An active suspension apparatus for a vehicle including: a pump that adjusts a movement of a fluid; and an actuator in which the fluid is supplied to a coil spring and which compensates for displacement of the coil spring, wherein the actuator includes first, second, third, and fourth actuators that are disposed at a left front wheel, a left rear wheel, a right front wheel, and a right rear wheel of the vehicle, respectively, and the pump is capable of simultaneously supplying the fluid to the first and second actuators or to the third and fourth actuators based on driving of a motor.

11 Claims, 5 Drawing Sheets

(51) Int. Cl.
 *F16H 25/22* (2006.01)
 *F04B 9/04* (2006.01)
 F16H 19/04 (2006.01)
 H02K 7/116 (2006.01)

(56) References Cited

U.S. PATENT DOCUMENTS

| | | | | |
|---|---|---|---|---|
| 6,240,348 | B1* | 5/2001 | Shono | B60G 17/017 |
| | | | | 280/124.159 |
| 2014/0260233 | A1* | 9/2014 | Giovanardi | F15B 13/0444 |
| | | | | 60/431 |

* cited by examiner

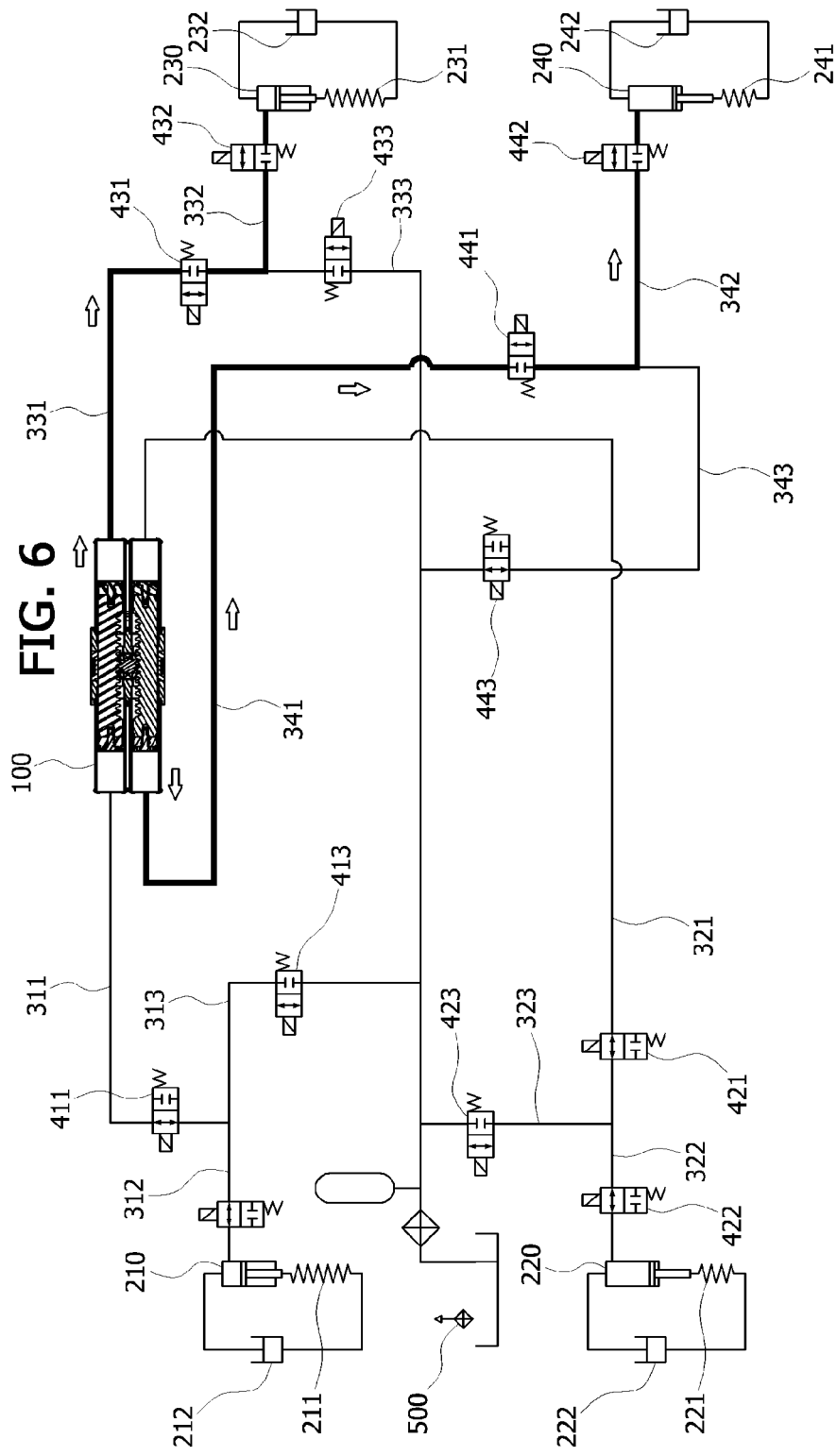

ACTIVE SUSPENSION APPARATUS FOR VEHICLE AND PUMP THEREOF

CROSS-REFERENCE TO RELATED APPLICATION

This application claims priority to and the benefit of Korean Patent Application No. 10-2014-0071082, filed on Jun. 11, 2014 the disclosure of which is incorporated herein by reference in its entirety.

BACKGROUND

1. Field of the Invention

The present invention relates to an active suspension apparatus for a vehicle and a pump thereof, and more particularly, to an active suspension apparatus for a vehicle that supplies a fluid to an actuator disposed at a wheel of the vehicle using a pump that is driven by a motor and a pump of the active suspension apparatus for the vehicle.

2. Discussion of Related Art

Active suspension systems for vehicles are systems that sense various inputs received from a road using a sensor and effectively control a rolling action of a vehicle, using an electric control unit (ECU) based on the sensed inputs.

In detail, an active suspension system for a vehicle includes an actuator that compensates for a displacement of a coil spring connected to a wheel of the vehicle and performs a function of properly controlling the volume of a fluid supplied to the actuator, by sensing rolling and pitching actions of the vehicle so as to maintain a body of the vehicle garage at a constant level so that riding quality and road traction force of the vehicle can be improved.

Furthermore, the active suspension system for the vehicle may enable a driver to set a height of the body of the vehicle according to the state of the road through level control of the body of the vehicle or may reduce an air resistance by lowering the body of the vehicle at a high speed, thereby performing a function of improving stability in driving and a fuel consumption ratio.

In connection with the active suspension system, U.S. Pat. No. 6,000,702 discloses technical content which includes a spring and a lift-adjustable regulating unit that is connected to the spring in series and in which a flow rate of a fluid supplied to the lift-adjustable regulating unit is controlled using a proportional control valve.

However, in the technical content, there is a problem that a high-priced proportional control valve and hydraulic pump need to be used. Furthermore, since the hydraulic pump is connected to an engine and is always driven, when the engine is in an operating state, the hydraulic pump needs to be always driven so as to generate a high-pressure source. Thus, an excessive capacity that is not required by a system is unnecessary, and an output of the engine is lowered, which results in a negative influence on a fuel consumption ratio.

SUMMARY OF THE INVENTION

The present invention is directed to an active suspension apparatus for a vehicle that is capable of reducing production cost and simplifying a structure of the active suspension apparatus without employing a high-priced proportional control valve.

The present invention is also directed to an active suspension apparatus for a vehicle that is capable of minimizing energy consumption by using a pump based on a motor and a cylinder.

According to an aspect of the present invention, there is provided an active suspension apparatus for a vehicle, including: a pump that adjusts a movement of a fluid; and an actuator in which the fluid is supplied from the pump and which compensates for displacement of a coil spring, wherein the actuator may include first, second, third, and fourth actuators that are disposed at a left front wheel, a left rear wheel, a right front wheel, and a right rear wheel of the vehicle, respectively, and the pump can simultaneously supply the fluid to the first and second actuators or to the third and fourth actuators based on driving of a motor.

The pump may include: a first chamber and a second chamber that are formed by partitioning a cylinder in a lengthwise direction of the cylinder; and a first piston and a second piston that are disposed in the first chamber and the second chamber, respectively, and the first piston and the second piston may be moved based on driving of the motor so that the fluid accommodated in the first chamber and the second chamber can be supplied to the actuator.

The pump may further include: a first rack bar and a second rack bar that move the first piston and the second piston within the first chamber and the second chamber, respectively; and a pinion that is disposed to engage with the first rack bar and the second rack bar, and when the pinion is rotated based on the motor, the first piston and the second piston may be moved in opposite directions.

The active suspension apparatus may further include a deceleration unit that transfers a driving force of the motor to the pinion.

The pump may further include a support yoke that supports at least one of the first rack bar and the second rack bar.

Due to movements of the first piston and the second piston, the fluid accommodated in the first chamber may be supplied to the first actuator and simultaneously, the fluid accommodated in the second chamber may be supplied to the second actuator, or the fluid accommodated in the first chamber may be supplied to the third actuator and simultaneously, the fluid accommodated in the second chamber may be supplied to the fourth actuator.

The active suspension apparatus may further include a valve that is disposed on the flow path and controls a flow of the fluid, wherein a flow path in which the fluid is flowable may be formed between the pump and the actuator.

According to another aspect of the present invention, there is provided a pump of an active suspension apparatus for a vehicle, the pump including: a first chamber and a second chamber that are formed by partitioning a cylinder in a lengthwise direction of the cylinder; and a first piston and a second piston that are disposed in the first chamber and the second chamber, respectively, wherein the first piston and the second piston may be moved in opposite directions based on driving of a motor.

The pump may further include: a first rack bar and a second rack bar that move the first piston and the second piston within the first chamber and the second chamber, respectively; and a pinion that is disposed to engage with the first rack bar and the second rack bar, and when the pinion is rotated based on the motor, the first piston and the second piston may be moved in opposite directions.

The pump may further include a deceleration unit that transfers a driving force of the motor to the pinion.

The pump may further include a support yoke that supports at least one of the first rack bar and the second rack bar.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIGS. 5 and 6 are circuit diagrams for describing a flow of a fluid according to situations in the active suspension apparatus for the vehicle of FIGS. 1 and 2.

DETAILED DESCRIPTION OF EXEMPLARY EMBODIMENTS

Figure 1:
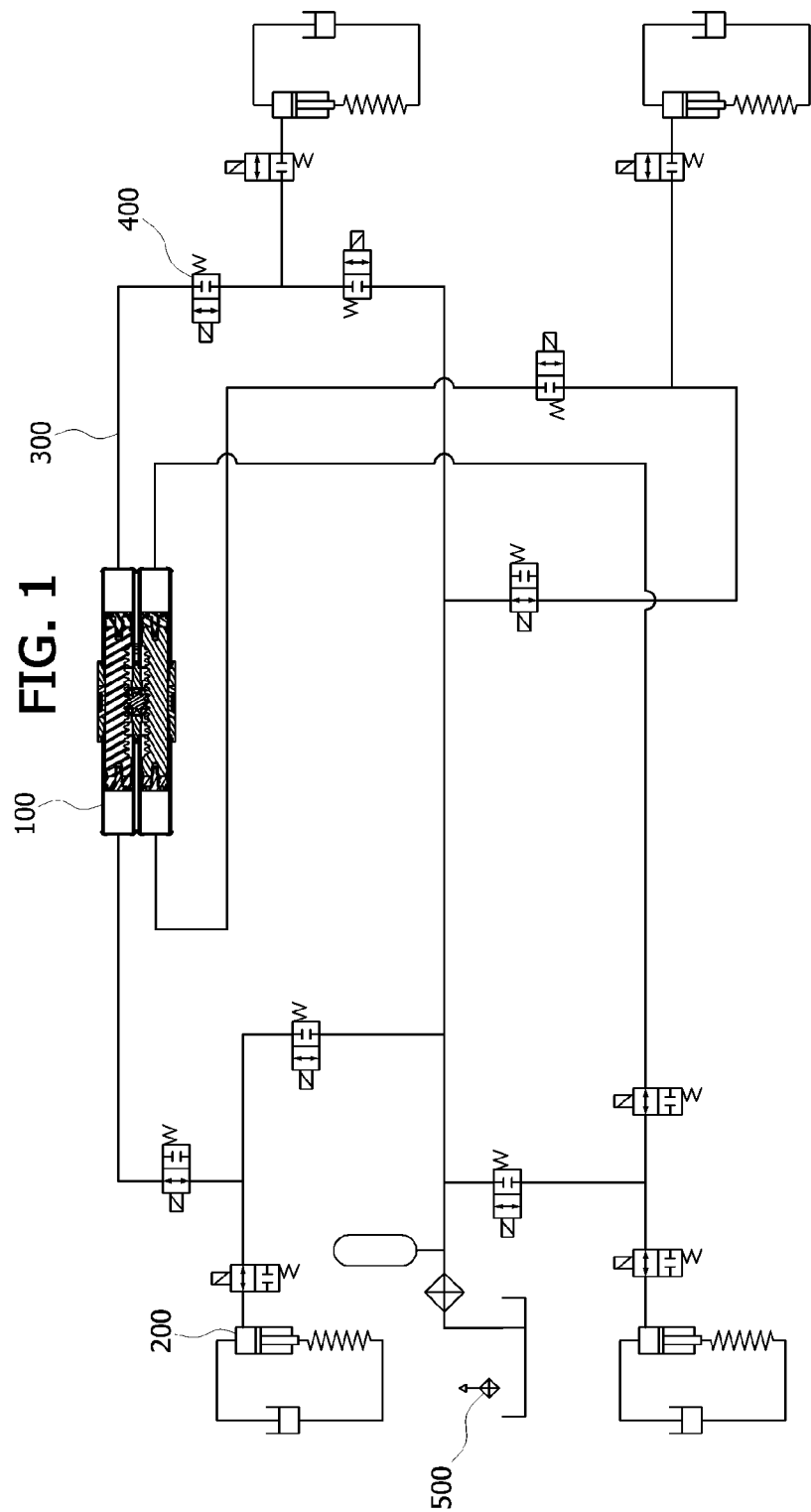
FIGS. 1 and 2 are circuit diagrams illustrating an active suspension apparatus for a vehicle according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications may be made without departing from the spirit and scope of the invention. Same or similar elements regardless of reference numerals refer to same reference numerals, and redundant descriptions thereof will be omitted.

Also, in the description of the present invention, certain detailed explanations of related art are omitted when it is deemed that they may unnecessarily obscure the essence of the invention. In addition, it should be noted that the accompanying drawings are merely used for easy understanding of the idea of the present invention and it should not be interpreted that the idea of the present invention is limited to the accompanying drawings.

Figure 2:
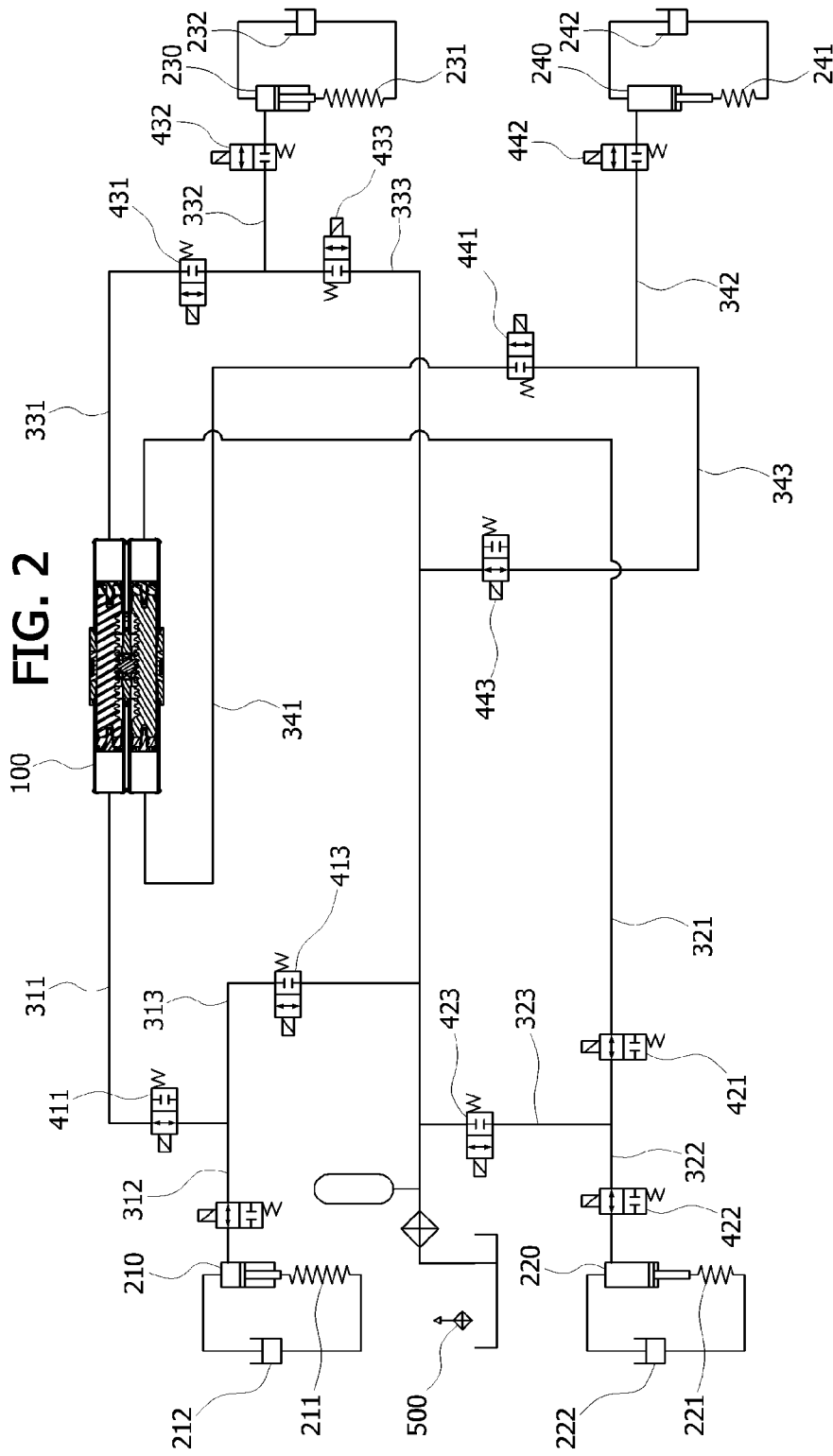

Hereinafter, an active suspension apparatus for a vehicle according to an embodiment of the present invention will be described with reference to FIGS. 1 and 2. FIGS. 1 and 2 are circuit diagrams illustrating an active suspension apparatus for a vehicle according to an embodiment of the present invention.

As illustrated in FIGS. 1 and 2, the active suspension apparatus for the vehicle according to an embodiment of the present invention may largely include a pump 100, an actuator 200, a flow path 300, valves 400, and a fluid reservoir 500.

The pump 100 is configured to generate a hydraulic pressure in a fluid used in the active suspension apparatus for the vehicle. The pump 100 performs a function of adjusting the movement of the fluid in the active suspension apparatus for the vehicle. In detail, the pump 100 is driven using a motor 110 (see FIG. 3). Since a pump of an active suspension apparatus for a vehicle according to the related art is a hydraulic pump, is connected to an engine and is always driven, unnecessary pressure is generated. However, if the active suspension apparatus for the vehicle according to the related art employs a structure in which the pump 100 is driven by the motor 110, like in the active suspension apparatus for the vehicle according to an embodiment of the present invention, an electric control unit (ECU) transmits signals to the motor 110 as needed, thereby selectively driving the pump 100 so that the effect of lowering an output of an engine and improving a fuel consumption ratio may be expected.

The fluid is supplied to the actuator 200 by the pump 100, as illustrated in FIGS. 1 and 2. The actuator 200 may include first, second, third, and fourth actuators 210, 220, 230, and 240 that are disposed at a left front wheel, a left rear wheel, a right front wheel, and a right rear wheel of the vehicle, respectively. The first, second, third, and fourth actuators 210, 220, 230, and 240 are connected to coil springs 211, 221, 231, and 241 and dampers 212, 222, 232, and 242. In particular, the first, second, third, and fourth actuators 210, 220, 230, and 240 perform a function of compensating for displacements of the coil springs 211, 221, 231, and 241.

In particular, the pump 100 may simultaneously supply the fluid to the first actuator 210 and the second actuator 220 or the third actuator 230 and the fourth actuator 240 based on driving of the motor 110. That is, the fluid may be simultaneously supplied to front and rear actuators of a left wheel of the vehicle or to front and rear actuators of a right wheel of the vehicle by driving the pump 100.

The flow path 300 is a path for movement of the fluid between the pump 100, the actuator 200, or the fluid reservoir 500. The flow path 300 formed between the pump 100 and the first actuator 210 may be classified into a part 1-1 flow path 311 that is connected directly to the pump 100, and a part 1-2 flow path 312 and a part 1-3 flow path 313 that diverge from the part 1-1 flow path 311, as illustrated in FIG. 2. The part 1-2 flow path 312 is a flow path connected to the first actuator 210, and the part 1-3 flow path 313 is a flow path connected to the fluid reservoir 500. A flow path that is connected to the pump 100 and the second actuator 220 and a flow path that is connected to the third actuator 230 and the fourth actuator 240 may also be subdivided, as illustrated in FIG. 2, like the flow path formed between the pump 100 and the first actuator 210. A detailed description thereof will be omitted.

The valves 400 are disposed on the flow path 300 and perform a function of controlling flow of the fluid. In particular, the active suspension apparatus for the vehicle according to an embodiment of the present invention employs an on/off valve instead of a proportional control valve and controls an operation of the on/off valve using the ECU, thereby selectively controlling the movement of the fluid. Thus, the effect of simplifying a system structure and reducing production cost may be expected.

If the flow rate of the fluid in the active suspension apparatus for the vehicle according to an embodiment of the present invention is excessive, the fluid reservoir 500 performs a function of accommodating and storing the excessive fluid. Also, if the actuator 200 requires a supply at a larger flow rate, the fluid reservoir 500 performs a function of supplying the fluid to each actuator 200 or the pump 100.

Figure 3:
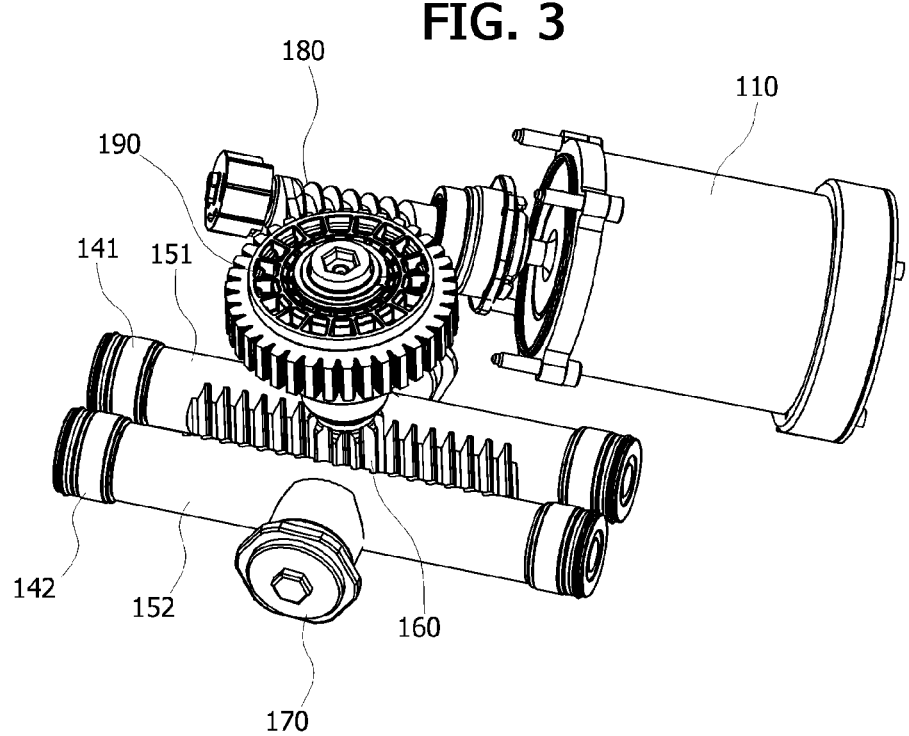
FIG. 3 is a view of an internal configuration for describing a combination of elements of a pump of the active suspension apparatus for the vehicle illustrated in FIGS. 1 and 2.

Hereinafter, the active suspension apparatus for the vehicle according to an embodiment of the present invention will be described in detail with reference to FIGS. 3 and 4. FIG. 3 is a combined view of an internal configuration for describing a combination of elements of a pump of the active suspension apparatus for the vehicle illustrated in FIGS. 1 and 2, and FIG. 4 is a cross-sectional view for identifying an internal structure of the pump of the active suspension apparatus for the vehicle of FIGS. 1 and 2.

Figure 4:
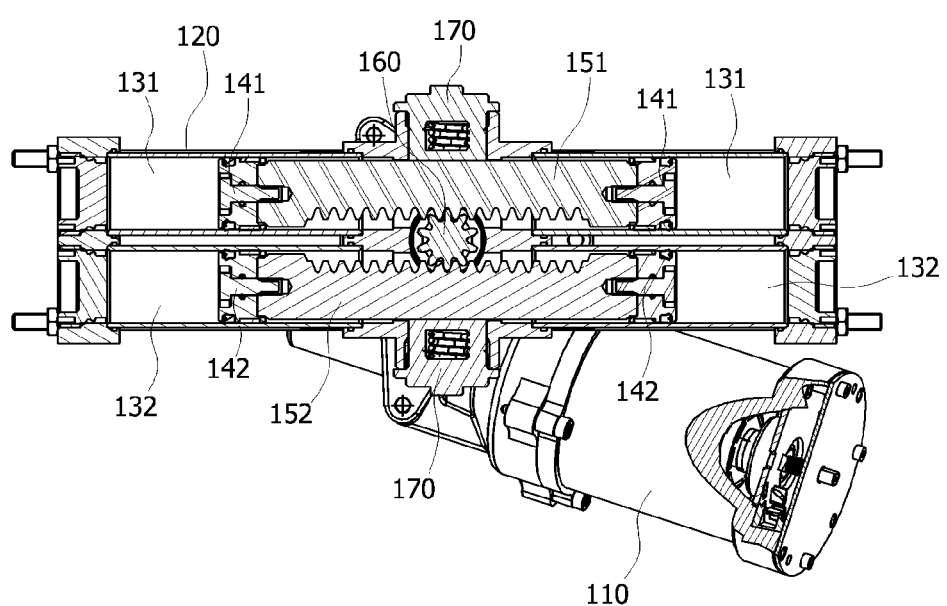
FIG. 4 is a cross-sectional view for identifying an internal structure of the pump of the active suspension apparatus for the vehicle of FIGS. 1 and 2.

The pump 100 of the active suspension apparatus for the vehicle according to an embodiment of the present invention includes elements, such as a first piston 141, a second piston 142, a first rack bar 151, a second rack bar 152, and a pinion 160, as illustrated in FIGS. 3 and 4.

A cylinder 120 is formed in the pump 100 of the active suspension apparatus for the vehicle according to an embodiment of the present invention, and a first chamber 131 and a second chamber 132 are formed by partitioning the cylinder 120 in a lengthwise direction of the cylinder 120. The first piston 141 and the second piston 142 are disposed in the first chamber 131 and the second chamber 132, respectively. The first piston 141 and the second piston 142 are moved, i.e., make a reciprocating motion, based on driving of the motor 110. Thus, the first piston 141 and the second piston 142 supply the fluid accommodated in the first chamber 131 and the second chamber 132 to the actuator 200. The motor 110 may be formed integrally with the pump 100 or may be separably disposed.

When describing the operation of the pump 100 of the active suspension apparatus for the vehicle according to an embodiment of the present invention in more detail, the first rack bar 151 and the second rack bar 152 each having one side in which a sawtooth-shaped groove is formed, support the first piston 141 and the second piston 142, respectively, and the pinion 160 is disposed to engage with the groove formed in one side of each of the first rack bar 151 and the second rack bar 152. If the pinion 160 is connected to the motor 110 and is rotated by the motor 110, the first rack bar 151 and the second rack bar 152 are moved in opposite directions. Consequently, the first piston 141 and the second piston 142 are moved in opposite directions due to movements of the first rack bar 151 and the second rack bar 152. Through the pump 100 having a dual cylinder structure, the fluid can be simultaneously supplied to the plurality of actuators 200. In general, in order to control a plurality of actuators using one pump, a capacity of the pump needs to be increased. However, due to a limitation in an output of a motor, there is a limitation in increasing the capacity of the pump. However, in the pump 100 having the dual cylinder structure applied to the active suspension apparatus for the vehicle according to an embodiment of the present invention, the plurality of actuators 200 may be simultaneously controlled without increasing the output of the motor 110.

In particular, the pump 100 of the active suspension apparatus for the vehicle according to an embodiment of the present invention may further include a deceleration unit that transmits a driving force of the motor 110 to the pinion 160. Described in detail, as illustrated in FIG. 3, if the pump 100 includes a warm gear 180 and a warm wheel 190 as the deceleration unit and the motor 110 rotates the warm gear 180, the warm wheel 190 disposed to engage with the warm gear 180 is rotated so that the pinion 160 may be rotated. Thus, a deceleration ratio may be increased, and a load of the motor 110 is reduced so that the efficiency of the motor 110 may be increased.

Meanwhile, the pump 100 of the active suspension apparatus for the vehicle according to an embodiment of the present invention may further include a support yoke 170 that supports at least one of the first rack bar 151 and the second rack bar 152. The support yoke 170 is configured to prevent a gap between the first rack bar 151 or the second rack bar 152 and the pinion 160 from occurring. Thus, a malfunction may be prevented from occurring due to abrasion of the groove formed on the first rack bar 151 or the second rack bar 152 or abrasion of a shape of the pinion 160 corresponding to the groove. Furthermore, rattle noise caused by formation of the gap may be prevented.

Figure 5:
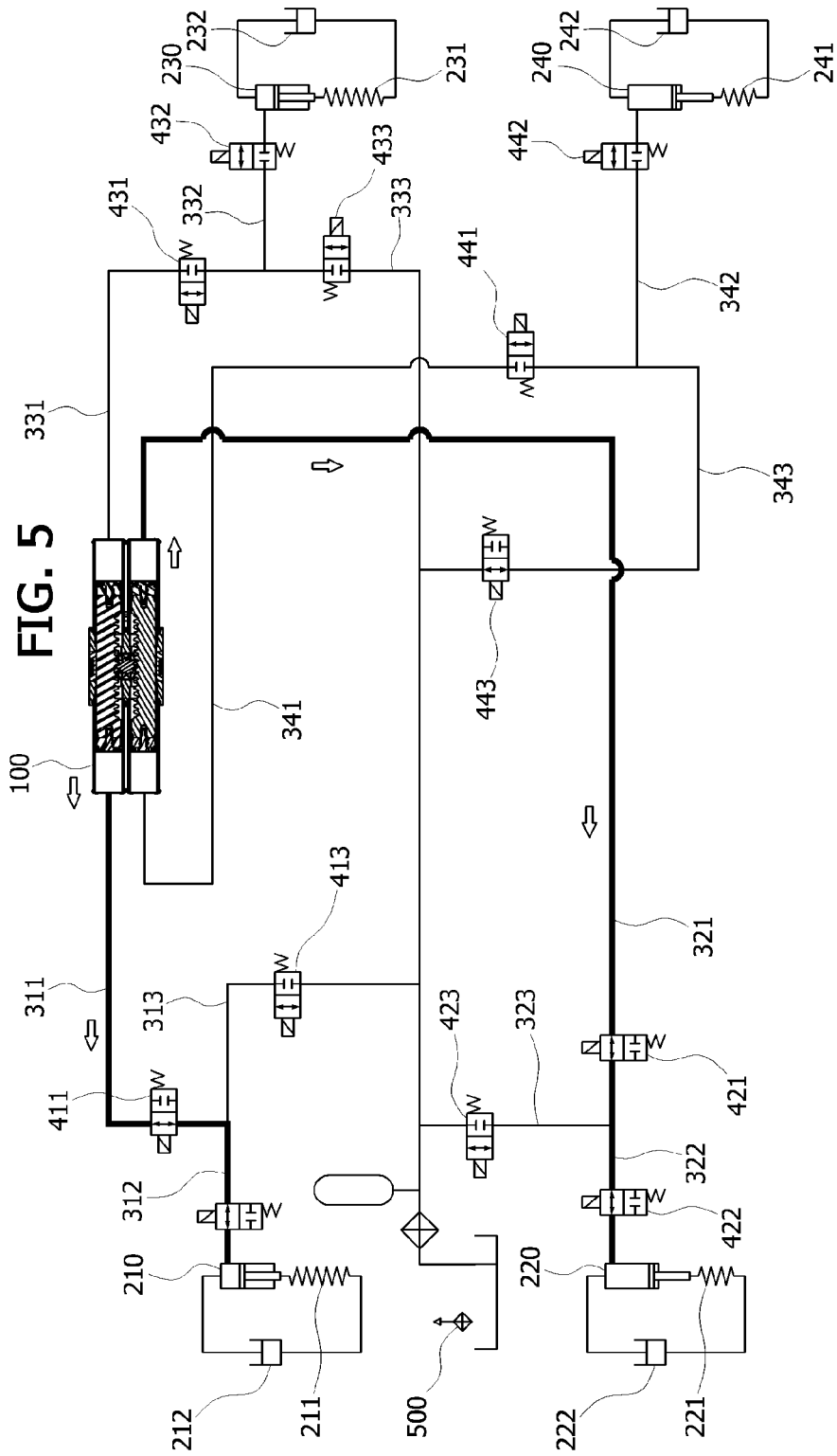

Hereinafter, the movement of the fluid resulting from driving the pump 100 of the active suspension apparatus for the vehicle according to an embodiment of the present invention will be described with reference to FIGS. 5 and 6. FIGS. 5 and 6 are circuit diagrams for describing a flow of a fluid according to situations in the active suspension apparatus for the vehicle of FIGS. 1 and 2.

First, a flow of the fluid when the fluid is simultaneously supplied to the first actuator 210 and the second actuator 220 that are front and rear actuators of the left wheel of the vehicle will be described with reference to FIG. 5. The ECU controls operations of the motor 110 of the pump 100 and the valves 400 based on road information received from a sensor of the vehicle or a user's settings. In detail, the ECU rotates the pinion 160 either clockwise or counterclockwise so as to move the first rack bar 151 in a left direction and simultaneously move the second rack bar 152 in a right direction. Due to the movements of the first rack bar 151 and the second rack bar 152, the first piston 141 is moved to the left, and the second piston 142 is moved to the right. Thus, the fluid accommodated in the first chamber 131 is transferred to the first actuator 210 via the part 1-1 flow path 311 and the part 1-2 flow path 312. A part 1-1 valve 411 and a part 1-2 valve 412 are disposed on the part 1-1 flow path 311 and the part 1-2 flow path 312, respectively, and the ECU opens the part 1-1 valve 411 and the part 1-2 valve 412 in such a way that the fluid may be smoothly moved through the part 1-1 flow path 311 and the part 1-2 flow path 312. Also, if it is determined that the volume of the fluid that flows into the first actuator 210 is excessive, the ECU opens a part 1-3 valve 413 that controls opening/closing of the part 1-3 flow path 313, thereby moving part of the excessive fluid to the fluid reservoir 500. Meanwhile, the fluid accommodated in the second chamber 132 is transferred to the second actuator 220 via a part 2-1 flow path 321 and a part 2-2 flow path 322. A part 2-1 valve 421 and a part 2-2 valve 422 are disposed on the part 2-1 flow path 321 and the part 2-2 flow path 322, respectively, and the ECU opens the part 2-1 valve 421 and the part 2-2 valve 422 in such a way that the fluid may be smoothly moved through the part 2-1 flow path 321 and the part 2-2 flow path 322. Also, if it is determined that the quantity of the fluid that flows into the second actuator 220 is excessive, the ECU opens a part 2-3 valve 423 that controls opening/closing of a part 2-3 flow path 323, thereby moving part of the excessive fluid to the fluid reservoir 500. As a result, the ECU controls the motor 110, the first valves 411, 412, and 413 and the second valves 421, 422, and 423 that are disposed on the first flow paths 311, 312, and 313 and the second flow paths 321, 322, and 323, respectively, so that the fluid may be simultaneously supplied by one pump 100 to the first actuator 210 and the second actuator 220 that are actuators of the left wheel of the vehicle. Furthermore, any one among the part 1-1 valve 411, the part 1-2 valve 412, the part 2-1 valve 421, and the part 2-2 valve 422 is closed so that any one of the first actuator 210 and the second actuator 220 may be independently controlled.

A flow of the fluid when the fluid is simultaneously supplied to the third actuator 230 and the fourth actuator 240 that are front and rear actuators of the right wheel of the vehicle, respectively, will be described with reference to FIG. 6. The ECU controls operations of the motor 110 of the pump 100 and the valves 400 based on road information received from the sensor of the vehicle or user's settings. In detail, the ECU rotates the pinion 160 in the other side direction so as to move the first rack bar 151 in the right direction and simultaneously move the second rack bar 152 in the left direction. Due to the movements of the first rack bar 151 and the second rack bar 152, the first piston 141 is moved to the right, and the second piston 142 is moved to the left. Thus, the fluid accommodated in the first chamber 131 is transferred to the third actuator 230 via a part 3-1 flow path 331 and a part 3-2 flow path 332. A part 3-1 valve 431 and a part 3-2 valve 432 are disposed on the part 3-1 flow path 331 and the part 3-2 flow path 332, respectively, and the ECU opens the part 3-1 valve 431 and the part 3-2 valve 432 so that the fluid may be smoothly moved through the part 3-1 flow path 331 and the part 3-2 flow path 332. Also, if it is determined that the quantity of the fluid that flows into the third actuator 230 is excessive, the ECU opens a part 3-3 valve 433 that controls opening/closing of a part 3-3 flow path 333, thereby moving part of the excessive fluid to the fluid reservoir 500. Meanwhile, the fluid accommodated in the second chamber 132 is transferred to the fourth actuator 240 via a part 4-1 flow path 341 and a part 4-2 flow path 342. A part 4-1 valve 441 and a part 4-2 valve 442 are disposed on the part 4-1 flow path 341 and the part 4-2 flow path 342, respectively, and the ECU opens a part 4-1 valve 441 and a part 4-2 valve 442 so that the fluid may be smoothly moved through the part 4-1 flow path 341 and the part 4-2 flow path 342. Also, if it is determined that the quantity of the fluid that flows into the fourth actuator 240 is excessive, the ECU opens a part 4-3 valve 443 that controls opening/closing of a part 4-3 flow path 343, thereby moving part of the excessive fluid to the fluid reservoir 500. As a result, the ECU controls the motor 110, the third valves 431, 432, and 433 and the fourth valves 441, 442, and 443 that are disposed on the third flow paths 331, 332, and 333 and the fourth flow paths 341, 342, and 343, respectively, so that the fluid may be simultaneously supplied to the third actuator 230 and the fourth actuator 240. Furthermore, any one among the part 3-1 valve 431, the part 3-2 valve 432, the part 4-1 valve 441, and the part 4-2 valve 442 is closed so that any one of the third actuator 230 and the fourth actuator 240 may be independently controlled.

A pump of an active suspension apparatus for a vehicle according to another embodiment of the present invention includes a first chamber 131 and a second chamber 133 that are formed by partitioning a cylinder 120 formed in the pump in a lengthwise direction of the cylinder 120, and a first piston 141 and a second piston 142 that are disposed in the first chamber 131 and the second chamber 132, respectively, and the first piston 141 and the second piston 142 are moved in opposite directions based on driving of the motor 110.

In particular, the pump further includes a first rack bar 151 and a second rack bar 152 that move the first piston 141 and the second piston 142 within the first chamber 131 and the second chamber 132, respectively, and a pinion 160 that is disposed to engage with the first rack bar 151 and the second rack bar 152. If the motor 110 rotates the pinion 160, the first piston 141 and the second piston 142 are moved in opposite directions. The pump may further include a support yoke 170 that supports at least one of the first rack bar 151 and the second rack bar 152. Furthermore, the pump may further include a deceleration unit that transfers a driving force of the motor 110 to the pinion 160. The above features have been previously described in detail and thus detailed descriptions thereof will be omitted.

As described above, an active suspension apparatus for a vehicle according to an embodiment of the present invention is implemented using a motor and cylinder-based pump, and a motor is driven only if it is required by a system to be driven, so as to operate the pump so that only a necessary pressure can be generated at an appropriate time and an output of an engine and a fuel consumption ratio can be improved.

Furthermore, not a proportional control valve but an on/off valve is employed as a valve for controlling the movement of a fluid so that competitiveness in production cost can be acquired and a structure of an overall system can be simplified.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An active suspension apparatus for a vehicle, comprising:
    a pump that adjusts a movement of a fluid; and
    an actuator in which the fluid is supplied from the pump and which compensates for displacement of a coil spring,
    wherein the actuator comprises first, second, third, and fourth actuators that are disposed at a left front wheel, a left rear wheel, a right front wheel, and a right rear wheel of the vehicle, respectively, and
    the pump is operative to simultaneously supply the fluid to the first and second actuators when a motor driving the pump is activated in one direction, and to simultaneously supply the fluid to the third and fourth actuators when the motor driving the pump is activated in another direction.

2. The active suspension apparatus of claim 1, further comprising a valve that is disposed on a flow path and controls a flow of the fluid,
    wherein the flow path in which the fluid is flowable is formed between the pump and the actuator.

3. An active suspension apparatus for a vehicle, comprising:
    a pump that adjusts a movement of a fluid; and
    an actuator in which the fluid is supplied from the pump and which compensates for displacement of a coil spring,
    wherein the actuator comprises first, second, third, and fourth actuators that are disposed at a left front wheel, a left rear wheel, a right front wheel, and a right rear wheel of the vehicle, respectively,
    the pump is capable of simultaneously supplying the fluid to the first and second actuators or to the third and fourth actuators based on driving of a motor,
    the pump comprises:
        a first chamber and a second chamber that are formed by partitioning a cylinder in a lengthwise direction of the cylinder; and
        a first piston and a second piston that are disposed in the first chamber and the second chamber, respectively, and
    the first piston and the second piston are moved based on driving of the motor so that the fluid accommodated in the first chamber and the second chamber is capable of being supplied to the actuator.

4. The active suspension apparatus of claim 3, wherein the pump further comprises:
    a first rack bar and a second rack bar that move the first piston and the second piston within the first chamber and the second chamber, respectively; and
    a pinion that is disposed to engage with the first rack bar and the second rack bar, and
    when the pinion is rotated based on the motor, the first piston and the second piston are moved in opposite directions.

5. The active suspension apparatus of claim 4, further comprising a deceleration unit that transfers a driving force of the motor to the pinion.

6. The active suspension apparatus of claim 4, wherein the pump further comprises a support yoke that supports at least one of the first rack bar and the second rack bar.

7. The active suspension apparatus of claim 3, wherein, due to movements of the first piston and the second piston, the fluid accommodated in the first chamber is supplied to the first actuator and simultaneously, the fluid accommodated in the second chamber is supplied to the second actuator, or
the fluid accommodated in the first chamber is supplied to the third actuator and simultaneously, the fluid accommodated in the second chamber is supplied to the fourth actuator.

8. An active suspension apparatus for a vehicle, comprising:
a pump that adjusts a movement of a fluid; and
an actuator in which the fluid is supplied from the pump and which compensates for displacement of a coil spring,
wherein the actuator comprises first, second, third, and fourth actuators that are disposed at a left front wheel, a left rear wheel, a right front wheel, and a right rear wheel of the vehicle, respectively,
the pump is capable of simultaneously supplying the fluid to the first and second actuators or to the third and fourth actuators based on driving of a motor,
the pump comprises:
a first chamber and a second chamber that are formed by partitioning a cylinder in a lengthwise direction of the cylinder; and
a first piston and a second piston that are disposed in the first chamber and the second chamber, respectively, and
the first piston and the second piston are moved in opposite directions based on driving of the motor.

9. The active suspension apparatus of claim 8, wherein the pump further comprises:
a first rack bar and a second rack bar that move the first piston and the second piston within the first chamber and the second chamber, respectively; and
a pinion that is disposed to engage with the first rack bar and the second rack bar, and
when the pinion is rotated based on the motor, the first piston and the second piston are moved in opposite directions.

10. The active suspension apparatus of claim 9, wherein the pump further comprises a deceleration unit that transfers a driving force of the motor to the pinion.

11. The active suspension apparatus of claim 9, wherein the pump further comprises a support yoke that supports at least one of the first rack bar and the second rack bar.

* * * * *